(12) United States Patent
Bnaya et al.

(10) Patent No.: US 12,242,984 B2
(45) Date of Patent: Mar. 4, 2025

(54) OWNERSHIP COST OPTIMIZATION FOR FLEET WITH ELECTRIC VEHICLES

(71) Applicant: GM GLOBAL TECHNOLOGY OPERATIONS LLC, Detroit, MI (US)

(72) Inventors: Zahy Bnaya, Petach Tikva (IL); Nadav Baron, Herzliya (IL); Refael Blanca, West Bloomfield, MI (US); Ravid Erez, Hod-Hashron (IL); Ariel Telpaz, Givat Haim Meuhad (IL)

(73) Assignee: GM Global Technology Operations LLC, Detroit, MI (US)

(*) Notice: Subject to any disclaimer, the term of this patent is extended or adjusted under 35 U.S.C. 154(b) by 371 days.

(21) Appl. No.: 17/857,496

(22) Filed: Jul. 5, 2022

(65) Prior Publication Data

US 2024/0013105 A1 Jan. 11, 2024

(51) Int. Cl.
*G08G 1/00* (2006.01)
*G06Q 10/047* (2023.01)

(52) U.S. Cl.
CPC .......... *G06Q 10/047* (2013.01); *G08G 1/20* (2013.01)

(58) Field of Classification Search
CPC .. G06Q 10/047; G06Q 30/0201; G06Q 10/04; G06Q 30/0203; G08G 1/20; G08G 1/00
USPC .......................................................... 701/22
See application file for complete search history.

(56) References Cited

U.S. PATENT DOCUMENTS

| | | | |
|---|---|---|---|
| 2019/0285425 A1* | 9/2019 | Ludwick ............ | G06Q 10/0631 |
| 2019/0325376 A1* | 10/2019 | Khasis ................. | G06Q 10/083 |
| 2021/0018324 A1* | 1/2021 | Sujan ................. | G01C 21/3492 |
| 2023/0234592 A1* | 7/2023 | Masquelier ............ | G06Q 50/40 |
| | | | 701/1 |

* cited by examiner

*Primary Examiner* — Shardul D Patel
(74) *Attorney, Agent, or Firm* — Quinn IP Law

(57) ABSTRACT

A system for optimizing ownership cost of a fleet having electric vehicles includes a command unit adapted to selectively execute a simulation module, a sampling module and an optimization module. The command unit is configured to construct a multi-agent model based at least partially on historical fleet trip data and mobility pattern data of the fleet. Route data for a set of fleet tasks is obtained, including charging infrastructure data. The command unit is configured to simulate different configurations of the electric vehicles carrying out the set of fleet tasks over a predefined period, via the simulation module, based in part on the multi-agent model and the route data. The command unit is configured to determine an optimal configuration from the different configurations of the electric vehicles, via the optimization module. The optimal configuration minimizes investment and operational costs of the fleet.

14 Claims, 4 Drawing Sheets

OWNERSHIP COST OPTIMIZATION FOR FLEET WITH ELECTRIC VEHICLES

INTRODUCTION

The present disclosure relates generally to a system and method for optimizing ownership cost over a predefined period for a fleet having electric vehicles. Fleet vehicles are groups of vehicles used and/or owned by an entity such as an organization, a business or a public agency. Fleet vehicles have become increasingly common. Examples of fleet vehicles include those operated by car rental companies, taxis or public buses, and police departments. Additionally, many online retailers may purchase or lease fleet vehicles to deliver products or packages to customers, or to enable sales representatives to travel to clients. Electric-powered fleet vehicles pose unique challenges compared to fleets employing internal combustion engines, such as issues related to battery charging and available range. Fleet managers often have concerns about transitioning from internal combustion engines to electric-powered vehicles due to the perception of higher costs. Given that multiple factors are involved, it is challenging to optimize the total ownership cost, including the infrastructure cost, of an electric-powered fleet.

SUMMARY

Disclosed herein is a system for optimizing ownership cost over a predefined period for a fleet having electric vehicles. The system includes a command unit having a processor and tangible, non-transitory memory on which instructions are recorded. The command unit is adapted to selectively execute a simulation module, a sampling module and an optimization module. The command unit is configured to construct a multi-agent model based at least partially on historical fleet trip data and mobility pattern data of the fleet. Route data for a set of fleet tasks is obtained, with the route data including charging infrastructure data.

The command unit is configured to simulate different configurations of the electric vehicles carrying out the set of fleet tasks over the predefined period, via (execution of) the simulation module, based in part on the multi-agent model and the route data. Respective expected costs for the different configurations of the electric vehicles are estimated via the sampling module. The command unit is configured to determine an optimal configuration from the different configurations of the electric vehicles, via the optimization module, based in part on the respective expected costs and subject to one or more constraints. The optimal configuration minimizes investment costs and operational costs of the fleet.

The constraint may be met when the set of fleet tasks is completed within a respective predefined time range. The constraint may be met when respective battery levels of the electric vehicles are maintained at a minimum percentage during the set of fleet tasks. The optimal configuration minimizes investment costs and operational costs of the fleet. In one embodiment, the predefined period is between one and five years. The optimization module may incorporate a Monte Carlo Markov-chain based algorithm and/or a Metropolis-Hastings module.

In one embodiment, the multi-agent model is adapted to generate charging curves and energy consumption data for the set of fleet tasks based on fleet behavior, and respective data from the electric vehicles and available electric vehicle supply equipment (EVSE). The multi-agent model may be based in part on mobility pattern data, including trip frequency, trip distances, trip speed, road types and acceleration profile of the electric vehicles. In one embodiment, the simulation module is adapted to receive available climate information for the set of fleet tasks as input. The charging infrastructure data may include respective data on public charging stations and fleet charging stations, including types of chargers available, charger locations, respective availability of charging sessions, respective costs of the charging sessions and charging spread forecasting.

The optimization module may generate, as an output, the optimal vehicle assignments and optimal charging assignments, including an assigned charging location, charging cost, target battery charging level and charging time respectively assigned to the electric vehicles and the charging infrastructure. The command unit may be adapted to determine a proposed new charging infrastructure by comparing respective outputs of a charging infrastructure simulation using historical data and different combinations of chargers.

Disclosed herein is a method for optimizing ownership cost over a predefined period for a fleet having electric vehicles. The method includes setting up a command unit with a processor and tangible, non-transitory memory on which instructions are recorded. The command unit is adapted to selectively execute a simulation module, a sampling module and an optimization module. A multi-agent model is constructed based at least partially on historical fleet trip data and mobility pattern data of the fleet. The method includes obtaining route data for a set of fleet tasks, the route data including charging infrastructure data. Different configurations of the electric vehicles are simulated carrying out the set of fleet tasks over the predefined period, based in part on the multi-agent model and the route data, via the simulation module. The method includes estimating respective expected costs for the different configurations of the electric vehicles, via the sampling module. The method includes determining an optimal configuration from the different configurations of the electric vehicles based in part on the respective expected costs and subject to at least one constraint, via the optimization module.

The above features and advantages and other features and advantages of the present disclosure are readily apparent from the following detailed description of the best modes for carrying out the disclosure when taken in connection with the accompanying drawings.

Figure 1:
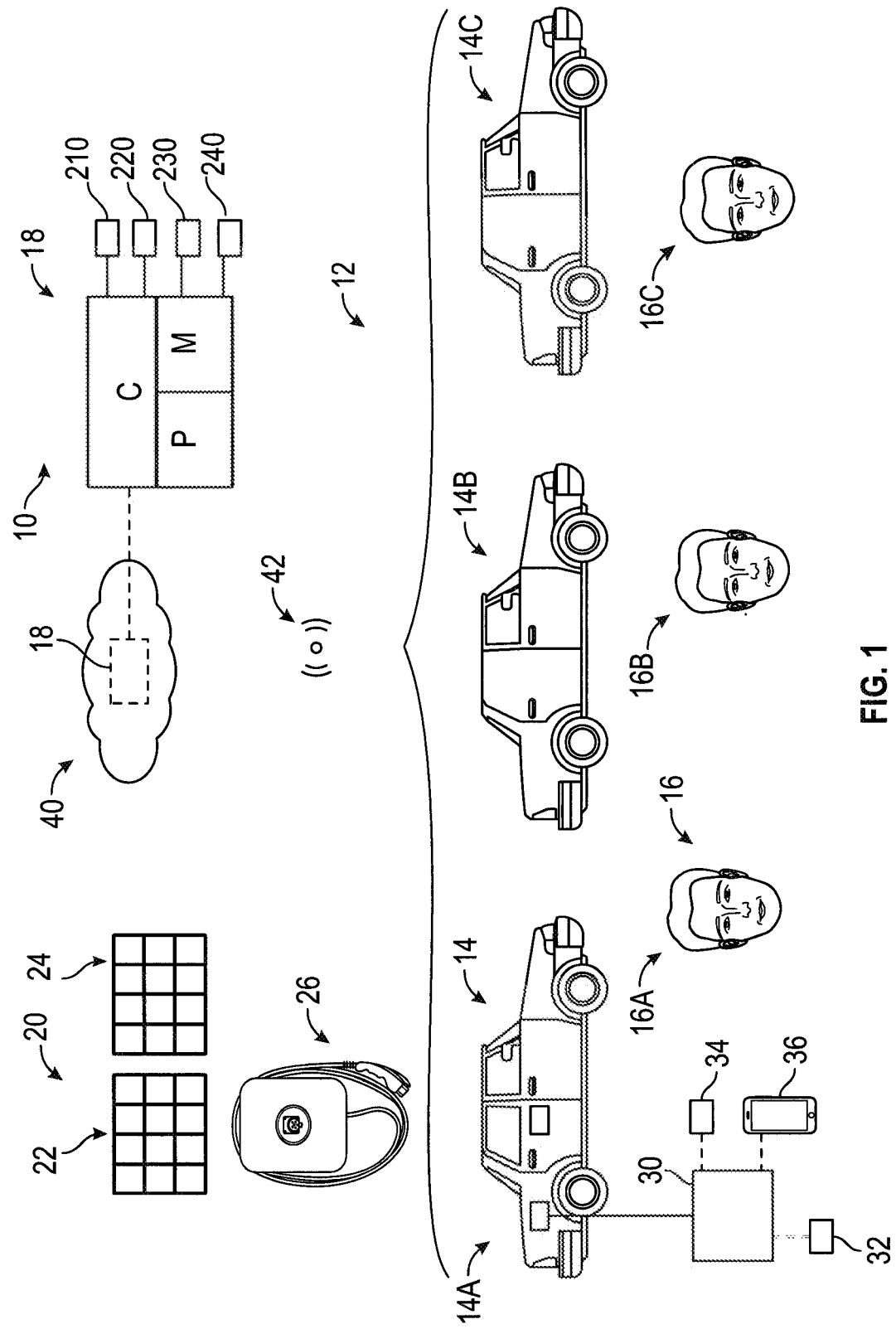
FIG. 1 is a schematic fragmentary diagram of a system for optimizing ownership cost of a fleet having electric-powered vehicles.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for optimizing the ownership cost of a fleet 12 having electric vehicles 14, e.g., first electric vehicle 14A, second electric vehicle 14B and third electric vehicle 14C. The electric vehicles 14 may be purely electric or partially electric/hybrid. The electric vehicles 14 may include, but are not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), train or another moving platform. It is to be understood that the electric vehicles 14 may take many different forms and have additional components. In some examples, the fleet 12 may include other vehicles with an internal combustion engine (ICE).

The fleet managers assign fleet tasks to the appropriate electric vehicles 14 and drivers 16 (e.g., drivers 16A, 16B, 16C shown in FIG. 1) based on their available range and energy consumption, in addition to scheduling charging times and locations for the fleet 12. The system 10 enables a fleet owner to optimize their investment decision in electric vehicles 14 and minimize their operational costs related to the electric vehicles 14 for a predefined period. The predefined period may be selected by the user or fleet owner based on the application at hand. In one example, the predefined period is between one and five years.

Referring to FIG. 1, the system 10 includes a command unit 18 having an integrated controller C with at least one processor P and at least one memory M (or non-transitory, tangible computer readable storage medium) on which instructions are recorded for a method 100 (described below with respect to FIG. 2). The memory M can store controller-executable instruction sets, and the processor P can execute the controller-executable instruction sets stored in the memory M.

Figure 3:
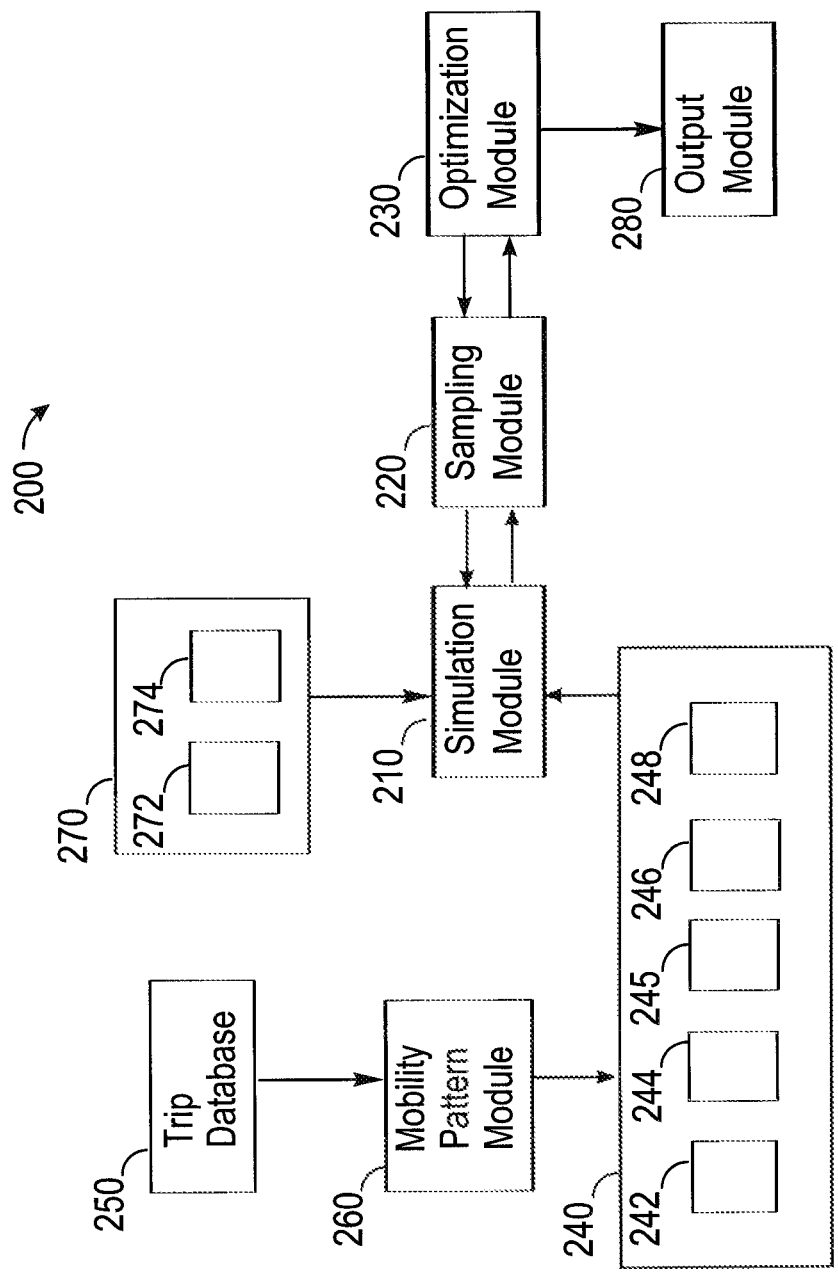
FIG. 3 is a schematic diagram of an example modular architecture employable by the system of FIG. 1.

An example modular architecture 200 employable by the system 10 is shown in FIG. 3. Referring to FIGS. 1 and 3, the command unit 18 is adapted to selectively execute a simulation module 210, a sampling module 220 and an optimization module 230. As described below, the method 100 includes simulation of the fleet trips as "electric vehicle trips" conducted by different configurations of electric vehicles 14 and usage of the charging infrastructure 20, via a simulation module 210. The output of the simulation module 210, together with information on the relevant cost elements is fed into an optimization module 230. Respective expected costs for the different configurations of the electric vehicles 14 are estimated via (execution of) the sampling module 220. The command unit 18 is configured to determine an optimal configuration from the different configurations of the electric vehicles 14, via the optimization module 230, based in part on the respective expected costs and one or more constraints. The optimal configuration minimizes investment costs and operational costs.

The system 10 obtains (as input) information regarding the characteristics of the electric vehicles 14, the mobility patterns of the drivers 16 related to energy consumption and task demands. Referring to FIG. 1, also considered is the availability of charging infrastructure 20, which includes fleet charging stations 22 and public charging stations 24, along the route taken by the fleet 12 in completing each task.

The system 10 also takes into account the investment cost in purchasing and installing electric vehicle supply equipment 26, referred to herein as EVSE 26. The EVSE 26 acts as a conduit for supplying electrical power to charge plug-in electric vehicles and may be fixedly attached or "hardwired" to a charging facility. Public charging stations 24 are typically found street-side or at retail shopping centers, public facilities, and other parking areas.

Referring to FIG. 1, the electric vehicles 14 each include respective vehicle controllers 30 collecting information from a network of sensors 32 inside the electric vehicles 14. Referring to FIG. 1, the electric vehicles 14 may include a respective telematics control unit 34 for establishing two-way communications with the command unit 18, including recording and transmitting vehicle data. For example, the respective telematics control unit 34 may collect telemetry data from the electric vehicles 14, such as location, speed, engine data, maintenance requirements and servicing, by interfacing with various internal sub-systems. The respective telematics control unit 34 may enable vehicle-to-vehicle (V2V) communication and/or a vehicle-to-everything (V2X) communication.

Referring to FIG. 1, the electric vehicles 14 may include a respective mobile application 36 for communicating with the command unit 18. The mobile application 36 may be embedded in a smart device (e.g., smart phone) belonging to a user of the electric vehicles 14, which may be plugged in or otherwise linked to the electric vehicles 14. The respective mobile application 36 may be physically connected (e.g., wired) to the electric vehicles 14 as part of the vehicle infotainment unit. The circuitry and components of a mobile application ("apps") available to those skilled in the art may be employed.

Referring to FIG. 1, the command unit 18 may be stored in an "off-board" or remotely located cloud computing service 40. The cloud computing service 40 may include one or more remote servers hosted on the Internet to store, manage, and process data. The cloud computing service 40 may be at least partially managed by personnel at various locations. The cloud computing service 40 may be a private or public source of information maintained by an organization, such as for example, a research institute, a company, a university and/or a hospital.

The system 10 may employ a wireless network 42 for communications between the electric vehicles 14 and the command unit 18, shown in FIG. 1. The wireless network 42 may be a short-range network or a long-range network. The wireless network 42 may be a communication BUS, which may be in the form of a serial Controller Area Network (CAN-BUS). The wireless network 42 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The wireless network 42 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

Figure 2:
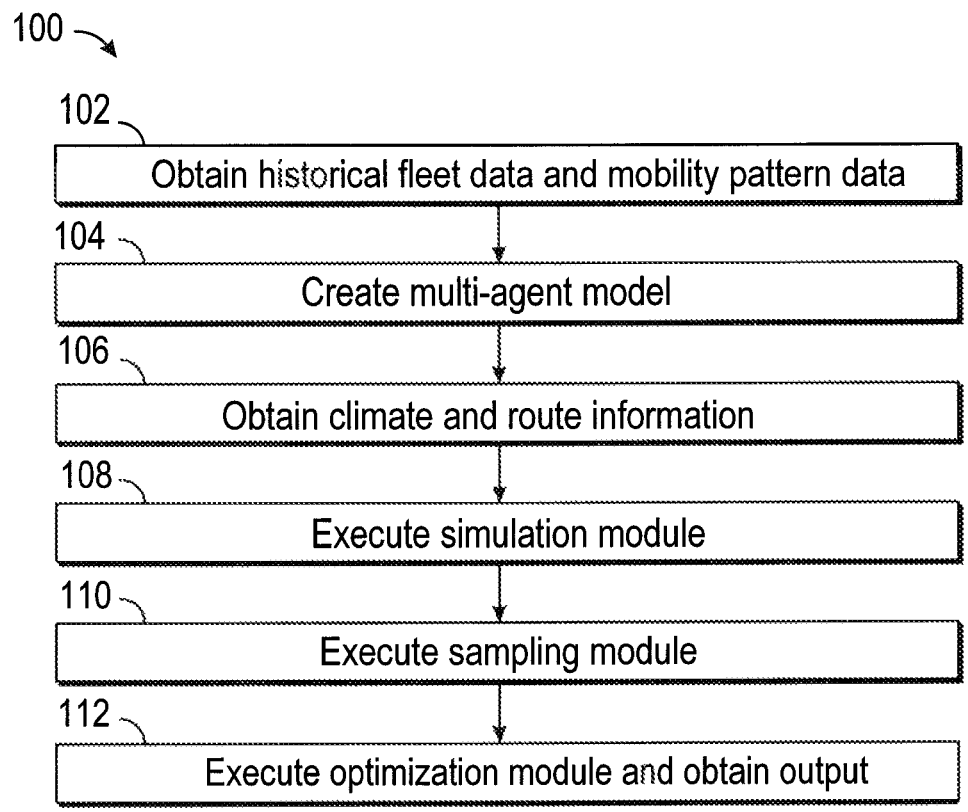
FIG. 2 is a flowchart for a method of operating the system of FIG. 1.

Referring now to FIG. 2, a flowchart of the method 100 of operating the system 10 is shown. In some embodiments, method 100 may be embodied as computer-readable code or stored instructions and may be at least partially executable by the command unit 18. Method 100 need not be applied in the specific order recited herein. Furthermore, it is to be understood that some blocks may be eliminated.

Per block 102 of FIG. 2, the method 100 includes obtaining historical fleet trip data, e.g., from a trip database 250. The historical fleet trip data is a sample representative set of trips. Block 102 includes obtaining mobility pattern data, e.g., from a mobility pattern module 260 (see FIG. 3). The mobility pattern data includes trip frequency, trip distances, trip speed, road types and acceleration profile.

Proceeding to block 104 of FIG. 2, the method 100 includes constructing a multi-agent model 240 with input from the historical fleet trip data and the mobility pattern data. As shown in FIG. 3, information from the trip database 250 and the mobility pattern module 260 is sent to the multi-agent model 240. The multi-agent model 240 is adapted to generate charging curves and energy consumption data for the set of fleet tasks based on a number of factors described below. Referring to FIG. 3, the multi-agent model 240 may incorporate fleet behavior 242 (whether cooperative or self-interested), charging policy 244 (including locations and urgency) and navigation policy 245 (sources and destination).

Referring to FIG. 3, the multi-agent model 240 may incorporate vehicle data 246 (including the available electric vehicles to select from and fleet size). The vehicle data 246 may include data specific to each of the electric vehicles 14, such as the propulsion energy consumption rate, available range, energy consumption per trip type and charging profile. The vehicle data 246 may include battery thermal preconditioning requirements, load/cargo capabilities, performance with trailers for each of the electric vehicles 14 and other factors. Referring to FIG. 3, the multi-agent model 240 may incorporate EVSE data 248 reflecting the number and types of chargers available.

Advancing to block 106 of FIG. 2, the method 100 includes obtaining route data 270 (see FIG. 3) for a set of fleet tasks or assignments given to the fleet 12. Block 106 includes obtaining climate data, such as temperature and weather patterns. The route data 270 may be obtained via a route calculator that calculates routes between the starting point and ending point of respective trips or fleet tasks. The route data 270 includes road network data 272 (see FIG. 3) which includes maps or geographical data. The route data 270 includes charging infrastructure data 274 (see FIG. 3) pertaining to the charging infrastructure 20 (see FIG. 1) along the set of fleet tasks assigned to the fleet 12, including the geographical locations of fleet charging stations 22 and public charging stations 24. The charging infrastructure data 274 may include the type of chargers (AC or DC) and the respective times of the available charging sessions. The charging infrastructure data 274 may incorporate charging spread forecasting, which includes the forecasting of future charging stations, such as those currently being built and those being planned for construction.

Advancing to block 108 of FIG. 2, the method 100 includes executing the simulation module 210 based on input from the multi-agent model 240 and route data 270. The simulation module 210 simulates different configurations of the electric vehicles 14 carrying out the set of fleet tasks over the predefined period. The simulation is based on variables pertaining to the set of fleet tasks, such as the starting point and ending point of a trip, the type of cargo or load required by the fleet task, the respective time ranges to the trip starting point and the trip ending point and other factors. The input variables may further include driver data, including driving style, energy efficient driving per trip type (urban, highway), handling of trailers and other factors.

The simulation module 210 may be executed for each fleet vehicle for each proposed combination of electric vehicles 14 and EVSE 26 to carry out the set of fleet tasks. The proposed combinations may be grouped according to energy consumed, the number of charging events, whether the charging events are public or private, the ranges between charging events and the maximum simultaneous charging events. The simulation module 210 simulates the fleet operations, including the predictive charging event and required ranges, and investment cost over the predefined period.

The input variables to the simulation module 210 may further include non-propulsion energy requirements of the set of fleet tasks. In other words, the command unit 18 may be adapted to consider instances in which the task duty requires using energy from the electric vehicles 14 to operate one or more electrical devices for completing a task. For example, the electrical device may be an electrical chainsaw that is plugged into the battery of an electric vehicle 14 for completing a task or assignment.

Proceeding to blocks 110 and 112 of FIG. 2, the method 100 respectively includes executing the sampling module 220 and the optimization module 230. As shown in FIG. 3, the interaction between the simulation module 210, the sampling module 220 and the optimization module 230 occurs in an iterative fashion. Referring to FIG. 3, the simulation module 210 transmits a cost sample to the sampling module 220, which samples it and sends back simulation instruction to the simulation module 210. The sampling module 220 estimates a respective expected cost each of the different configurations of electric vehicles 14 based on the cost sample. The respective expected cost may be modelled as a Gaussian distribution. In one embodiment, the sampling module 220 incorporates a Monte Carlo Markov-chain based algorithm. In another embodiment, the sampling module 220 incorporates a Metropolis-Hastings module.

Referring to FIG. 3, the sampling module 220 transmits a cost sample to the optimization module 230 which transmits back the next configuration to be estimated to the sampling module 220. The optimization module 230 estimates confidence intervals for each configuration. This iterative process is repeated until a predefined confidence level is reached for each configuration.

Given a configuration of electric vehicles 14 and charging infrastructure 20, the optimization module 230 finds the sum of initial investment and operational costs for the predefined time period. The optimization module 230 estimates the total cost of the optimal configuration (charges and their types) out of a finite set of configurations. The optimization module 230 selects which configuration to sample next based on a balance between exploration and exploitation. These steps are repeated until the best configuration is found with a predetermined acceptable confidence level.

The optimization module 230 may employ an objective function (as a sum of the investment and operational cost) that is minimized and subject to at least one constraint. For example, the constraint may be met when the set of fleet tasks is completed within a respective predefined time range and/or when respective battery levels of the electric vehicles 14 are maintained at a minimum percentage during the set of fleet tasks.

The optimization module 230 may employ a sample-efficient Monte Carlo method (e.g., Metropolis-Hastings) to learn the distribution of the selected configuration. In one example, the optimization module 230 uses a combinatorial multi-armed algorithm. Other algorithms available to those skilled in the art may be employed. The results of the optimization module 230 are transmitted to an output module 280, as shown in FIG. 3.

The optimization module 230 is adapted to find a set of vehicle types (e.g., vehicles having similar battery capacity) and compatible EVSE that will minimize the one-time investment cost and operational costs. The one-time investment cost for the electric vehicles 14 depends on its respective purchase price and residual value. The vehicle residual value is affected by the total mileage driven (which may be learned from the mobility pattern scenarios), the selected vehicle type/model and battery residual value (which depends on battery degradation prediction and second life use value). The vehicle battery may be sold separately from the vehicle. The one-time investment cost for the EVSE is affected by the purchase price of the charging station, the installation cost and the residual value of the EVSE.

The output of the optimization module 230 may include recommendations on the fleet stationary energy storage size. The output module 280 may receive a schedule of available charging slots in the fleet charging stations 22. The slots may be offered to the public for a given cost, who would be informed about charging time limits and potential fines for exceeding the charging time limits. The additional potential revenue may be added as an influence on the total ownership cost.

Figure 4:
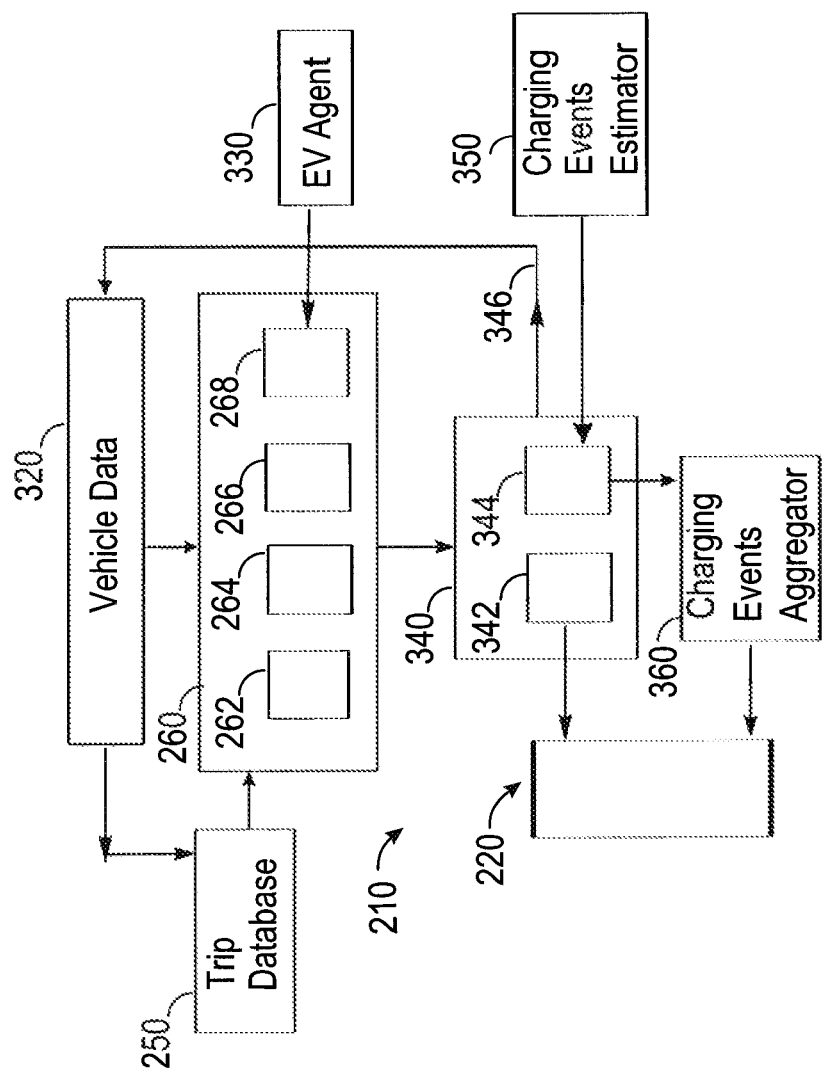
FIG. 4 is a schematic diagram of an example simulation module employable by the system of FIG. 1.

Referring now to FIG. 4, an example configuration for the simulation module 210 is shown. It is understood that other configurations may be employed. The simulation process is repeated for each vehicle. Referring to FIG. 4, information for each of the electric vehicles 14 (represented by vehicle data 320) is transmitted to the trip database 250 and to the mobility pattern module 260 in each cycle. The data may be obtained by Monte Caro sampling for each fleet vehicle. The mobility pattern module 260 may incorporate sub-modules representing the number of trips 262, a distance and velocity profile 264 and a trips matrix 266. Referring to FIG. 4, the mobility pattern module 260 includes an EV ("electric vehicle") model 268 which receives input from an EV agent 330, which accounts for a number of factors including energy consumption, battery capacity and charging power of each of the electric vehicles.

Referring to FIG. 4, information from the mobility pattern module 260 is fed to a charging process module 340, which incorporates sub-modules representing the energy consumed 342 and the EV charging events 344. The EV charging events 344 receive input from a charging events estimator 350 and in turn, transmits information to a charging events aggregator 360. The charging events estimator 350 accounts for the amount and types of EVSE 26 found in the charging infrastructure and may embody a preference for the fleet charging stations 22. Referring to FIG. 4, the charging events aggregator 360 receives input from the EV charging events 344 and transmits it to the optimization module 230. Data from the energy consumed 342 (in the charging process module 340) and charging events aggregator 360 is transmitted to the sampling module 220 and/or optimization module 230. The charging events aggregator 360 accounts for the number of predicted simultaneous charging events across each of the electric vehicles 14 in the fleet 12. As indicated by line 346, the vehicle data 320 is updated with data from the charging process module 340 in a feedback loop.

In some embodiments, the fleet 12 includes both electric vehicles and non-electric vehicles (ICE). The fleet manager may determine which proportion of long trips may be excluded from the analyses (e.g., the long trips may be assigned to the ICE vehicles) in order to find the optimal combination of electric vehicles 14 and EVSE 26 for significantly lowering the total ownership cost.

In summary, a system 10 for optimizing ownership cost of the fleet 12 is presented. The energy costs for a fleet 12 are optimized, making it more beneficial for a fleet 12 to purchase electric vehicles 14. The method 100 optimizes investment by considering battery capacity, charging capacity, as well as uncertain energy consumption and available charging times. Both one-time capital investment costs and operational costs are covered. The energy consumption of the electric vehicles 14 affects the investment decision concerning the required battery capacity and the EVSE charging capacity as well as the operational costs. Contextual factors such as climate are also considered. The method 100 accounts for the uncertainties associated with the future energy consumption of the fleet 12 and available charging slots.

The command unit 18 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling operation of an electric vehicle, the system comprising:
a command unit adapted to selectively execute a simulation module, a sampling module and an optimization module, the command unit having a processor and tangible, non-transitory memory on which instructions are recorded;
a battery unit installed in the electric vehicle, the electric vehicle being part of a fleet having a plurality of electric vehicles;
an electrical device plugged into the battery unit, the electrical device being adapted to perform at least one fleet task through an energy transfer from the battery unit;
wherein the command unit is configured to:
construct a multi-agent model based at least partially on historical fleet trip data and mobility pattern data of the fleet;
obtain route data for a set of fleet tasks, the route data including charging infrastructure data;
simulate different configurations of the plurality of electric vehicles carrying out the set of fleet tasks over a predefined period, based in part on the multi-agent model and the route data, via the simulation module;
estimate respective expected costs for the different configurations of the plurality of electric vehicles, via the sampling module;
determine an optimal configuration for the electric vehicle over the predefined period from the different configurations of the plurality of electric vehicles based in part on the respective expected costs and subject to at least one constraint, via the optimization module;
wherein the at least one constraint is met when a battery level of the electric vehicle is maintained at a minimum percentage during the at least one fleet task; and
wherein the command unit directs control of the energy transfer from the battery unit to the electrical device in the electric vehicle based in part on the optimal configuration.

2. The system of claim 1, wherein the optimal configuration minimizes investment costs and operational costs of the fleet and the predefined period is between one and five years.

3. The system of claim 1, wherein the optimization module incorporates a Monte Carlo Markov-chain based algorithm and/or a Metropolis-Hastings module.

4. The system of claim 1, wherein the multi-agent model is adapted to generate charging curves and energy consumption data for the set of fleet tasks based on fleet behavior, and respective data from the plurality of electric vehicles and available electric vehicle supply equipment (EVSE).

5. The system of claim 1, wherein the multi-agent model is based in part on mobility pattern data, including trip frequency, trip distances, trip speed, road types and acceleration profile of the plurality of electric vehicles.

6. The system of claim 1, wherein the simulation module is adapted to receive input on available climate information for the set of fleet tasks.

7. The system of claim 1, wherein the charging infrastructure data includes respective data on public charging stations and fleet charging stations, including types of chargers available, charger locations, respective availability of charging sessions, respective costs of the charging sessions and charging spread forecasting.

8. The system of claim 1, wherein an output of the optimization module generates optimal vehicle assignments and optimal charging assignments, including an assigned charging location, charging cost, target battery charging level and charging time respectively assigned to the plurality of electric vehicles and the charging infrastructure.

9. The system of claim 1, wherein the command unit is adapted to determine a proposed new charging infrastructure by comparing respective outputs of a charging infrastructure simulation using historical data and different combinations of chargers.

10. A method for controlling operation of an electric vehicle, the method comprising:
setting up a command unit with a processor and tangible, non-transitory memory on which instructions are recorded, the command unit being adapted to selectively execute a simulation module, a sampling module and an optimization module;
installing a battery unit installed in the electric vehicle, the electric vehicle being part of a fleet having a plurality of electric vehicles;

connecting an electrical device to the battery unit, the electrical device being adapted to perform at least one fleet task through an energy transfer from the battery unit;

constructing a multi-agent model based at least partially on historical fleet trip data and mobility pattern data of the fleet;

obtaining route data for a set of fleet tasks, the route data including charging infrastructure data;

simulating different configurations of the plurality of electric vehicles carrying out the set of fleet tasks over the predefined period, based in part on the multi-agent model and the route data, via the simulation module;

estimating respective expected costs for the different configurations of the plurality of electric vehicles, via the sampling module;

determining an optimal configuration for the electric vehicle over the predefined period from the different configurations of the plurality of electric vehicles based in part on the respective expected costs and subject to at least one constraint, via the optimization module;

defining the at least one constraint to be met when a battery level of the electric vehicle is maintained at a minimum percentage during the at least one fleet task; and directing control of the energy transfer from the battery unit to the electrical device in the electric vehicle based in part on the optimal configuration, via the command unit.

11. The method of claim 10, further comprising:
incorporating a Monte Carlo Markov-chain based algorithm and/or a Metropolis-Hastings module in the optimization module.

12. The method of claim 10, further comprising:
generating charging curves and energy consumption data for the set of fleet tasks, via the multi-agent model, based in part on fleet behavior, respective data from the plurality of electric vehicles and available electric vehicle supply equipment (EVSE).

13. The method of claim 10, further comprising:
transmitting mobility pattern data to the multi-agent model, including trip frequency, trip distances, trip speed, road types and acceleration profile of the plurality of electric vehicles.

14. The method of claim 10, further comprising:
receiving input on available climate information for the set of fleet tasks, via the simulation module.

* * * * *